United States Patent [19]

Bendle et al.

[11] Patent Number: 5,472,835
[45] Date of Patent: Dec. 5, 1995

[54] PREPARATION OF SOLUTIONS FOR USE IN PHOTOGRAPHY

[75] Inventors: David R. Bendle, Adeyfield; David G. N. English, Richmansworth; Jeremy S. Foster, Watford, all of England

[73] Assignee: Eastman Kodak Company, Rochester, N.Y.

[21] Appl. No.: 263,101

[22] Filed: Jun. 21, 1994

[30] Foreign Application Priority Data

Jul. 1, 1993 [GB] United Kingdom .................. 9313575

[51] Int. Cl.[6] .................................... G03C 7/32
[52] U.S. Cl. ..................... 430/546; 430/543; 430/557; 430/545; 366/156.1; 366/75
[58] Field of Search ..................... 430/543, 546, 430/557, 545; 366/150, 156, 162, 75

[56] References Cited

U.S. PATENT DOCUMENTS

| | | | |
|---|---|---|---|
| 1,980,216 | 11/1934 | Merritt | 427/207.1 |
| 3,010,932 | 11/1961 | Stoveken | 264/182 |
| 3,169,751 | 2/1965 | Steele | 366/150 |
| 4,233,397 | 11/1980 | Tada et al. | 430/546 |
| 4,250,132 | 2/1981 | Beach | 264/68 |
| 4,379,836 | 4/1983 | Schnoring et al. | 430/377 |
| 4,474,473 | 10/1984 | Higuchi et al. | 366/75 |
| 4,537,513 | 8/1985 | Flesher et al. | 366/162 |
| 4,606,647 | 10/1986 | Frye | 366/150 |
| 5,198,328 | 3/1993 | Shiba et al. | 430/545 |
| 5,262,290 | 11/1993 | Nakatsugawa et al. | 430/537 |
| 5,290,668 | 3/1994 | Ohtani | 430/496 |
| 5,342,745 | 8/1994 | Tai et al. | 430/538 |

FOREIGN PATENT DOCUMENTS 1315667  3/1979  France .

Primary Examiner—Thomas R. Neville
Attorney, Agent, or Firm—Carl F. Ruoff

[57] ABSTRACT

The present invention is a process for continuous preparation of solutions of water-immiscible or water-insoluble organic compounds in substantially non-aqueous organic solvents. Particularly, a process for the continuous preparation of colour forming coupler solutions for use in the photographic industry is described. The process uses a twin screw extruder wherein the compound to be dissolved is introduced into a first section of the extruder. The compound passes along the extruder interior to a section where organic solvent is introduced to form the required solution.

10 Claims, 1 Drawing Sheet

PREPARATION OF SOLUTIONS FOR USE IN PHOTOGRAPHY

FIELD OF THE INVENTION

This invention relates to a process for the continuous preparation of solutions of organic compounds in organic solvents and in particular to a process for the continuous preparation of colour forming coupler solutions for use in the photographic industry.

BACKGROUND OF THE INVENTION

Colour forming coupler solutions for use in the photographic industry are solutions of complex organic compounds such as 2-[4'-(4-benzyloxy-phenylsulphonyl) phenoxy]-N-2'-chloro-5'-[4'-(2,5-di-tert amylphenoxy) butyramido] phenyl-2-pivaloyl acetamide in solvents such as 1:1 mixtures of di-N-butyl phthalate and 2(-2 butoxy ethoxy) ethyl acetate. At present these solutions are made by a batch process in which the solution is prepared in an open vessel generally known as a kettle. This process is lengthy, typically taking up to 40 minutes to make the coupler solution, and during this lengthy period there is a marked tendency for degradation to occur in the solution. Moreover, since the solution is formed in an open vessel, it is in contact with the air and there is also a tendency for oxidation to occur in the solution. Additionally the volume of the kettle is generally such that there is significant wastage of material in the event that the process is interrupted or ceased for any reason.

U.S. Pat. No. 4,379,836, published 12 Apr. 1983 describes a process for the production of photographic emulsions consisting of water-immisible or water-insoluble organic substances and an aqueous solution of an organic binder, characterised in that the hydrophilic and hydrophobic phases involved are heated separately, each to its particular temperature above its liquefaction point, and then continuously dosed into a dispersing chamber. The specification of this patent discloses in Example 2 the supply of solid, pulverulent couplers into a solution shaft (single shaft extruder) which is at the same time supplied with tricresyl phosphate heated to 120° C. so that a solution is continuously formed. In this instance heat is supplied by hot solvent rather than by use of e.g. heating jackets.

SUMMARY OF THE INVENTION

According to the present invention we provide a process for the continuous preparation of solutions of water-immiscible or water-insoluble organic compounds in substantially non-aqueous organic solvents characterised in that a compound to be dissolved is introduced into a first section of a twin screw extruder and passes along the extruder interior in the direction of flow to a second section of the extruder into which an organic solvent is introduced to form the required solution, the temperature in the extruder interior being maintained at appropriate levels along its length.

Suitably the twin screw extruder is of the type usually used for the extrusion of plastics materials. The first section, into which a compound or if necessary a plurality of compounds to be dissolved are introduced, is preferably at the end of the extruder from which material can begin to travel along its interior—a section often referred to in the extruder art as zone 1 of an extruder. The second section is "down-stream" of the first section in the direction of flow in the interior of the extruder and may be immediately adjacent to the first section, i.e. in zone 2 of an extruder. However the second section is suitably separated from the first section to some extent i.e. by at least one zone. Preferably the second section is separated from the first section by one zone of the extruder and therefore, when the first section is in the preferred position at the end of the extruder, the second section is in zone 3. For the purpose of this discussion a twin screw extruder is regarded as being effectively divisible into a number of zones. The number of zones can be for example in the range five to ten, preferably six to eight. In an extruder having six zones, such as that which will be used in the discussion herein, these will be numbered 1 to 6 in the direction in which material passes "downstream" along the interior of the extruder. During operation of the twin screw extruder to form the solution, the twin screws enmesh and force powder/solution along the interior of the extruder by friction. During the process of the invention addition of organic compounds and/or particularly of solvent may take place at more than one position.

In operation of the process of the invention the temperature of the interior of the extruder is controlled. This can be done using for example a temperature controlling jacket which may be used either to heat or to cool the extruder interior. Generally the extruder interior is heated and in this case heat is supplied to it by friction due to material passing along it and/or by using, for instance, heating jackets in order to keep the various zones and in particular those used as the first and second sections at temperatures appropriate to the organic compound and the solvent being used. Suitable temperatures for the various zones are influenced by, inter alia, the melting point of the organic compound and the required outlet temperature from the extruder. Assuming that zone 1 is the first section and that zone 3 is the second section, the following comments can be made about appropriate temperatures in the various zones:

Zone 1 is suitably at a temperature below the melting point of the organic compound since this is not intended to melt in zone 1—a preferred minimum temperature for zone 1 is approximately 50° C.;

Zones 2 and 3 are the zones in which the organic compound is suitably melted and hence the temperatures in these zones are suitably appropriate for this to take place;

Zone 4 is preferably at a temperature similar to the temperatures in zones 2 and 3; and Zones 5 and 6 are zones in which the temperatures are suitably determined by the required outlet temperature for the extruder.

In the above system the various zones in the extruder have the functions described below.

Zone 1 is the first section. Here the organic compound is added as a crystalline powder suitably at a controlled rate of flow.

Zone 2 is a compression zone which serves to prevent solvent added in the second section flowing backwards along the interior of the extruder. In this zone melting of the organic compound begins.

Zone 3 is the second section in which the organic solvent (or most of it) is added, preferably at a controlled rate. Further melting of the organic compound will generally take place in this zone.

Zone 4 is a first expansion zone.

Zone 5 is a compression zone in which a vacuum is applied.

Zone 6 is a temperature conditioning and compression zone.

The organic solvent is preferably a high boiling solvent e.g. with a boiling point in the range 200° C., to 450° C. Suitable solvents include (A) a 1:1 mixture of di-N-butyl phthalate and 2(-2 butoxy ethoxy) ethyl acetate and (B) 1,4 Cyclohexylene dimethylene bis (2-ethyl hexanoate). Preferably the organic compound is in crystalline form, suitable compounds being (A) 2-[4'-(4-benzyloxy-phenylsulphonyl) phenoxy]-N-2'-chloro-5'-[4'-(2,5-di-tert amylphenoxy) butyramido] phenyl-2-pivaloyl acetamide and (B) "TINUVIN" (Trade Mark)—a product of Ciba Geigy. Preferably the solution prepared in the process of the invention is a concentrated solution with the ratio of solid compound to solvent being greater than 1:1.

The process of the invention has the following advantages:

1. It allows continuous rather than batchwise preparation of solutions.

2. The duration of heating can be very short due to the high surface to volume ratio available. For instance typically the process is complete in 30 seconds.

3. The available free air surface is very limited and this together with the short duration (2 above) reduces thermal and oxidative degradation of any component.

4. The low internal volume of the apparatus minimises wastage in the event of process interruption or cessation.

5. The solution can be degassed during the process.

6. No hot solvent is exposed to the atmosphere since the whole apparatus is enclosed.

The invention is initially intended for use in the preparation of colour forming coupler solutions for use in the photographic industry and has mainly been described in connection with such use. However it should be understood that it has wider applicability to the production of solutions of organic compounds in organic solvents generally.

DETAILED DESCRIPTION OF THE PREFERRED EMBODIMENT

Figure 1:
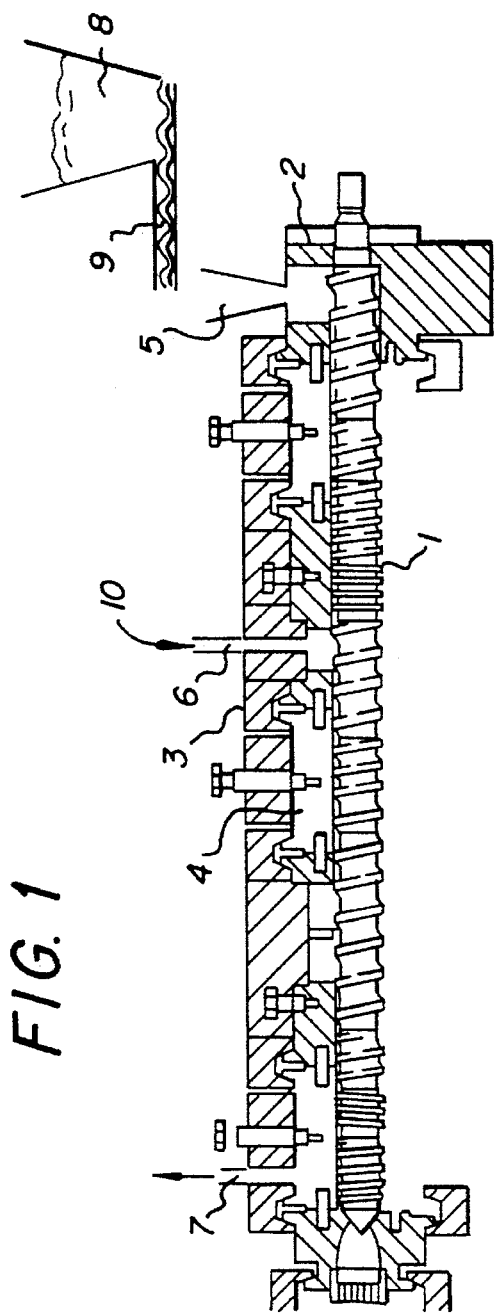
FIG. 1 is a cross-sectional elevation of a typial twin screw extruder for use in the process of the invention.

FIG. 1 shows one of the screws 1 of a twin screw extruder supported in housing 2 and surrounded by heating jacket 3. There are entrances to the interior 4 of the extruder at 5, 6 and 7 respectively for admission of powdered compound at 5, admission of solvent at 6 and for application of a vacuum at 7. The powdered compound is supplied at 5 from hopper 8 by controlled means 9. The solvent is added at 6 through pipe 10 in a controlled manner.

Figure 2:
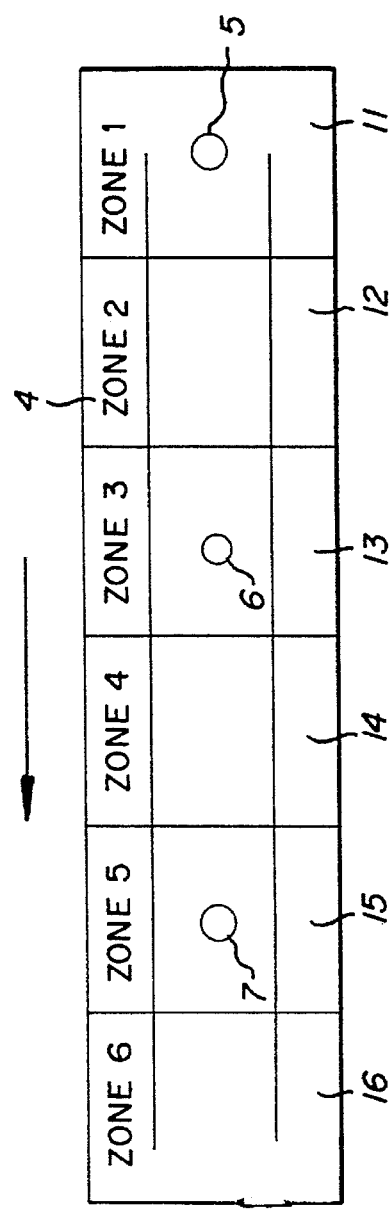
FIG. 2 is a diagrammatic plan view of the extruder of FIG. 1 showing the zones into which it is divided.

FIG. 2 shows zones 1 to 6 in order proceeding "downstream" along interior 4 of the extruder. The direction of flow of material along interior 4 is shown by the arrow. Zone 1 acts as the first section and is marked 11. Here the compound is added. Zone 2 (marked 12) is a compression zone and is intended to prevent solvent added in zone 3 (marked 13) flowing backwards along interior 4 of the extruder. 13 acts as the second section of the extruder. Zone 4 (marked 14) is a first expansion zone. Zone 5 (marked 15) is a compression zone to which a vacuum is applied whilst zone 6 (marked 16) is a temperature conditioning and compression zone.

Figure 3:
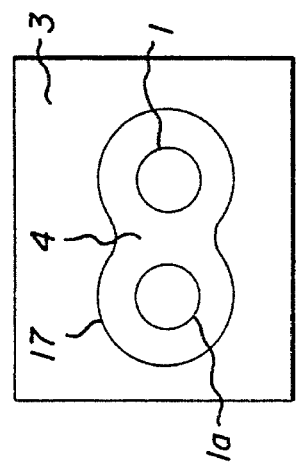
FIG. 3 is a diagrammatic end view of the extruder of FIG. 1 showing how the twin screws enmesh with each other.

FIG. 3 shows screw 1 enmeshed with companion screw 1a in extruder interior 4, which interior is surrounded by outer skin 17 and heating jacket 3.

The invention is further illustrated by the Example.

EXAMPLE

The twin srew extruder of FIGS. 1 to 3, having a length to diameter ratio of 21:1 and six heating zones (Nos 1 to 6 in "downstream" direction), was used to prepare a solution of a yellow colour coupling powder compound (A) (complete chemical name given above) in a 1:1 solvent mixture of di-N-butyl phthalate and 2(-2 butoxy ethoxy) ethyl acetate.

The temperature profile across the six zones in the order 1 to 6 was as follows;

130° C.:145° C.: 160° C.: 160° C.:135° C.:160° C.

The powder was introduced at zone 1 (first section) at a rate of 155 g/min by means of a screw feeder.

The solvent was introduced at zone 3 (second section) at a rate of 95 g/min by means of a speed controlled peristaltic pump.

Vacuum was applied to zone 5 at a level just sufficient to eliminate the pressurisation caused by operation of the screws.

A clear solution of the coupler was obtained from the end of the extruder following zone 6 at a temperature of 144° C.

We claim:

1. A process for the continuous preparation of solutions of water-immiscible or water-insoluble organic compounds in substantially non-aqueous organic solvents characterised in that a compound to be dissolved is introduced into a first section of a twin screw extruder and passes along the extruder interior in the direction of flow to a second section of the extruder into which an organic solvent is introduced to form the required solution, the temperature in the extruder interior being maintained at appropriate levels along its length.

2. A process according to claim 1 characterised in that the solutions are colour forming coupler solutions adapted for use in the photographic industry.

3. A process according to claim 1 characterised in that the organic compound is 2-[4'-(4-benzyloxy-phenylsulphonyl) phenoxy]-N-2'-chloro-5'-[4'-( 2,5-di-tert amylphenoxy) butyramido] phenyl -2-pivaloyl acetamide.

4. A process according to claim 1, characterized in that the extruder is of the type used for the extrusion of plastics materials having effectively five to ten zones along its length.

5. A process according to claim 4 characterised in that the extruder has effectively six to eight zones along its length.

6. A process according to claim 4 characterised in that the first section is zone 1 at the end of the extruder from which material can begin to travel along its interior.

7. A process according to claim 6 characterised in that the second section is zone 3.

8. A process according to claim 1, characterized in that the temperature in the interior of the extruder is controlled using a temperature controlling jacket.

9. A process according to claim 1, characterized in that the organic solvent has a boiling point in the range 200° C. to 450° C.

10. A process according to claim 1, characterized in that the organic solvent is a mixture of di-N-butyl phthalate and 2(-2 butoxy ethoxy) ethyl acetate.

* * * * *

UNITED STATES PATENT AND TRADEMARK OFFICE
CERTIFICATE OF CORRECTION

PATENT NO. : 5,472,835
DATED : December 5, 1995
INVENTOR(S) : David R. Bendle et al It is certified that error appears in the above-indentified patent and that said Letters Patent is hereby corrected as shown below:

On the title page, item [54] and Col. 1, lines 1-2 the title should read --PREPARATION OF SOLUTIONS--.

Signed and Sealed this

Twelfth Day of March, 1996

Attest:

BRUCE LEHMAN

*Attesting Officer*          *Commissioner of Patents and Trademarks*